United States Patent
Narayanaswami et al.

(10) Patent No.: US 7,558,604 B2
(45) Date of Patent: Jul. 7, 2009

(54) METHOD AND APPARATUS FOR REMOTE DISCOVERY OF CLIENT AND ACCESS POINT SETTINGS IN A WIRELESS LAN

(75) Inventors: Chandrasekhar Narayanaswami, Wilton, CT (US); Claus Michael Olsen, Cortlandt Manor, NY (US); Marcel-Catalin Rosu, Ossining, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 572 days.

(21) Appl. No.: 11/287,182

(22) Filed: Nov. 25, 2005

(65) Prior Publication Data

US 2007/0124412 A1    May 31, 2007

(51) Int. Cl.
*H04Q 7/20* (2006.01)
(52) U.S. Cl. ............... 455/574; 455/550.1; 455/572; 455/343.1; 455/426.1; 455/343.4; 370/311; 370/328; 370/329; 370/346
(58) Field of Classification Search ............... 455/574, 455/572, 550, 426.1, 426.2, 343.1–343.6, 455/422.1, 403, 445, 500, 517, 466, 573, 455/550.1; 370/311, 328, 329, 346, 313
See application file for complete search history.

(56) References Cited

U.S. PATENT DOCUMENTS

| | | | | |
|---|---|---|---|---|
| 5,625,882 | A * | 4/1997 | Vook et al. | 340/7.34 |
| 7,224,970 | B2 * | 5/2007 | Smith et al. | 455/434 |
| 2004/0255008 | A1 | 12/2004 | Olsen et al. | |
| 2005/0018624 | A1 | 1/2005 | Meier et al. | 370/318 |
| 2005/0025081 | A1 * | 2/2005 | Wakamatsu | 370/311 |
| 2006/0160508 | A1 | 7/2006 | Narayanaswami et al. | 455/151.2 |
| 2007/0021155 | A1 * | 1/2007 | Yu et al. | 455/574 |

FOREIGN PATENT DOCUMENTS

| | | |
|---|---|---|
| EP | 1684465 | 1/2005 |
| WO | WO 00/22837 | 4/2000 |

OTHER PUBLICATIONS

M. Rosu, M. Olsen, C. Narayanaswami, IBM T. J. Watson Research Center, L. Luo, School of Computer Science, Carnegie Mellon University, PAWP: A Power Aware Web Proxy for Wireless LAN Clients.

(Continued)

*Primary Examiner*—Keith T Ferguson
(74) *Attorney, Agent, or Firm*—Ference & Associates LLC (57) ABSTRACT

To conserve energy, components in mobile devices have to transition less frequently between "active" and "sleep" modes, and to sleep for longer intervals. In accordance with at least one preferred embodiment of the present invention, there is broadly contemplated herein an approach for remote discovery of wireless client and access point configurations, especially those settings associated with the power consumption of the client's wireless interface. Methods contemplated in the preferred embodiment use packet probing techniques to determine the client and access point configurations remotely. The probing techniques include sending packets to the client device, over the wireless LAN, at intervals calculated using data publicly available on the wireless LAN technology in use and results of previous packet probing measurements. Measurements from several packet probes and methods for statistical data processing are used to make a determination.

23 Claims, 4 Drawing Sheets

OTHER PUBLICATIONS

S. Mohapatra, R. Cornea, N. Dutt, A. Nicolau, N. Venkatasubramanian, Department of Information & Computer Science, Integrated Power Management for Video Streaming to Mobile Handheld Devices.

M. Anand, E. B. Nightingale, and J. Flinn, "Self-Turning Wireless Network Power Management," In *Proceedings of ACM MOBICOM 2002*.

S. Chandra, " Wireless Network Interface Energy Consumption Implications of Popular Streaming Formats," In *Proceedings of MMCN 2002*.

S. Chandra and A. Vahdat, "Application-Specific Network Management for Energy-Aware Streaming of Popular Multimedia Formats," In *Proceedings of The 2002 USENIX Annual Technical Conference*.

D. Duchamp, "Prefetching Hyperlinks," In *Proceedings of USITS 1999*.

M. Gundlack, S. Doster, D. K. Lowenthal, S. A. Watterson, and S. Chandra, "Dynamic, Power-Aware Scheduling for Mobile Clients Using a Transparent Proxy," In *Proceedings of ICPP 2004*.

R. Krashinsky and H. Balakrishnan, "Minimizing Energy for Wireless Web Access with Bounded Slowdown," In *Proceedings of ACM MOBICOM 2002*.

T. M. Kroeger, D. D. E. Long and J. C. Mogul, "Exploring the Bounds of Web Latency Reduction from Caching and Prefetching," In *Proceedings of USITS 1997*.

S. Mohapatra, R. Cornea, N. Dutt, A. Nicolau, and N. Venkatasubramanian, "Integrated Power Management for Video Streaming to Mobile Handheld Devices," In *Proceedings of ACM Multimedia 2003*.

Part 11: Wireless LAN Medium Access Control (MAC) and Physical Layer (PHY) Specifications, ANSI/IEEE Standard 802.11, 1999.

A. E. Papathanasiou and M. L. Scott, "Energy Efficiency through Burstiness," In *Proceedings of IEEE WMCSA 2003*.

D. Qiao, S. Choi, A. Jain, and K. G. Shin, "MiSer: An Optimal Low-Energy Transmission Strategy for IEEE 802.11 a/h," In *Proceedings of ACM MOBICOM 2003*.

H. Shulzrinne, A. Rao, and R. Lanphier, Real Time Streaming Protocol, RFC 2326, IETF, Apr. 1998.

Y. Kikuchi, T. Nomura, S. Fukunaga, Y. Matsui, H. Kimata, RTP Payload Format for MPEG-4 Audio/Visual Streams, RFC 3016, IETF, Nov. 2000.

H. Shulzrinne, S. Casner, R. Frederick, V. Jacobson, RTP: A Transport Protocol for Real-Time Applications, RFC 3550, IETF, Jul. 2003.

M. C. Rosu, C. M. Olsen, C. Narayanaswami, and L. Luo, "*PAWP*": A Power-Aware Web Proxy for Wireless LAN Clients, In *Proceedings of IEEE WMCSA 2004*.

T. Simunic, L. Benini, P. Glynn, and G. De Micheli, "Dynamic Power Management for Portable Systems," In *Proceedings of ACM MOBICOM 2000*.

E. Shih, P. Bahl, and M. J. Sinclair, "Wake on Wireless: An Event Driven Energy Saving Strategy for Battery Operated Devices," In *Proceedings of ACM MOBICOM 2002*.

M. Stemm and R. Katz, Measuring & Reducing Energy Consumption of Network Interfaces in Handheld Devices. In *IEICE Trans. on Fundamentals of Electronics, Communications, and Computer Science*, Aug. 1997.

P. Shenoy and P. Radkov, "Proxy-Assisted Power-Friendly Streaming to Mobile Devices," In *Proceedings of the 2003 Multimedia and Networking(MMCN) Conference*.

\* cited by examiner

METHOD AND APPARATUS FOR REMOTE DISCOVERY OF CLIENT AND ACCESS POINT SETTINGS IN A WIRELESS LAN

FIELD OF THE INVENTION

The present invention generally relates to the field of computer software, and more particularly to design and development of network proxies, which are part of the software that supports client applications to access server-based resources.

BACKGROUND OF THE INVENTION

Network proxy servers are networked applications designed to assist client applications interact efficiently with remote servers. Typically, proxy servers are implemented as user-level applications running on dedicated, high-performance networked server machines. For better performance, the same functionality can be implemented in a module inside the server's kernel, or in a networked appliance. SOCKS servers represent an early example of network proxies. Web proxy caches (see, e.g., Ari Lutonen, *Web Proxy Servers*, Prentice Hall, 1997) are probably the best known example of network proxies.

Web proxy caches are designed to improve the performance of client browsers and user experience by reducing page download latencies. Client browsers are configured to request content from the web proxy cache. If the proxy has a local copy of the requested document, it returns the document to the client. Otherwise, it forwards the client request to the origin server and forwards the response to the client. The proxy may store a copy of the forwarded document in the local cache (disk). Page download latencies are reduced because the latency of accessing the web proxy server across the enterprise or campus network is much lower than the latency of accessing the origin sever across the Internet. The higher the cache hit rate is, the more page download latencies are reduced. In order to achieve a high cache hit rate, proxy caches have to serve a large client population. Otherwise, the probability of getting a cache hit, i.e., requesting a document that was previously requested by another client, is relatively low. Cache hit rates can reach 50% for large proxy installations serving multiple institutions. In addition to reducing user-perceived latencies, proxies reduce the load on the origin web servers.

Besides improving user experience, web proxy servers provide clients with indirect Internet access. As a result, client machines are protected from a wide range of Internet-originated attacks. In such configurations, using the web proxy is the only way for accessing the Internet: all client machines are placed behind a firewall, which is configured to prevent clients from accessing servers outside the enterprise or campus intranet. The web proxy server is protected from Internet attacks using special host configurations and firewalls. The web proxy server is typically a single-purpose machine, which simplifies the firewall configuration: only HTTP traffic is allowed from/to the web proxy server.

Other networked applications, such as media players or email clients, were changed to take advantage of this proxy-based security architecture and use HTTP as a transport protocol. As a result, a significant amount of the client traffic is, or it can be, directed through the local web proxy. As bandwidth availability and client local cache increase, and more web sites use latency reduction technologies, such as Content Distribution Networks (CDN), the value of using web proxies as caches diminishes. However, the security-related benefits of using web proxies are increasingly obvious since application-level proxies are the only realistic method that enables deep inspection of the network traffic, i.e., HTTP payload for web proxy servers.

Independently, to assist resource-constraint mobile devices, a new category of application-level proxies was developed. Transcoding proxies, which assist PDA/smart phone browsers to display web content on small screens, are probably the most popular example in this category. In addition, web proxy caches provide more benefits to wireless clients than desktop clients because mobile clients have smaller local caches than desktop clients and wireless connections have higher latencies and lower bandwidth than wired LAN connections. More recently, transcoding proxies have been extended to adapt multimedia streams to the mobile client capabilities or to reduce the energy consumed to play the streams. In summary, it is expected that application-level proxies, in particular, HTTP proxies will play an increasingly important role in assisting resource constrained mobile wireless clients.

Reducing the energy consumed by mobile clients is a very important problem as battery capacity has not increased at the same rate as the performance of the device component over the past several years. Although significant technological improvements have reduced the power consumed by these components, most of these improvements reduce the performance of the components as well, or degrade other characteristics of the mobile system, such as responsiveness. At present, capabilities of mobile devices are significantly restricted by the capacity of their batteries and the power-related restrictions are not expected to disappear in the foreseeable future.

Using a web proxy to shape incoming WLAN traffic or transcoding and scheduling media streams in a power-friendly manner enable substantial savings in the energy consumed by the WLAN interface of a client or the mobile client device (see J. Clark et al, "System for low power operation of wireless LAN interfaces", US patent application Ser. No 11/927,572, Marcel C Rosu et al., "PAWP: A Power-Aware Proxy for Wireless LAN Clients", WMCSA 2004, English Lake District, Dec. 2-3, 2004; and S. Mohapatra et al., "Integrated Power Management for Video Streaming to Mobile Handheld Devices," In *Proceedings of ACM Multimedia* 2003.) These approaches are focused to one client running one application (web browser or media player) and there is no clear extension of these approaches to multiple applications and mobile clients.

In contrast, relatively little work has been done on supporting a collection of mobile devices as a group and optimize their usage of shared resources according to group policies. More specifically, there are no known techniques for power-aware scheduling of the shared WLAN bandwidth between the mobile clients, despite the fact that a significant fraction of the energy consumed by mobile clients is directly or indirectly communication-related. Unfortunately, efficiently scheduling WLAN traffic to enable significant energy savings requires more information about the client configuration, current state, application, and application payload than currently available.

Using transport- or network-level attributes, such as client IP address or TCP/UDP port number, to differentiate between users or applications, is difficult since the majority of the WLAN traffic consists of TCP packets carrying HTTP payloads, i.e. using TCP port 80. An increasing number of networked applications besides web browsers, such as multimedia streaming or email clients, use HTTP as this simplifies firewall configuration considerably; this trend is expected to continue. In addition, dynamic IP address allocation is the preferred method for managing the addresses of mobile WLAN clients, which makes even more difficult to use network/transport level attributes to differentiate between different applications/users on the WLAN. Therefore, there is a need to use application-level information to identify users and applications, which is, or could be made available to the network proxies assisting client applications.

Unfortunately, not enough information on the current state of the mobile client system, such as the configuration of its wireless interface, is made available at the application level. Therefore there is a need to either enhance existing client protocols and applications to provide such additional client information or design new methods and an apparatus for collecting this information remotely, from unmodified clients.

Provided that enough information on the configuration and current state of the mobile devices is collected, a need has been recognized in connection with providing a mechanism that controls the usage of shared resources, such as WLAN bandwidth, in a way that promotes energy savings in all the client devices under control. Without such a mechanism, existing techniques which were developed for one client device running one application, will conflict with each other and fail to enable the expected energy savings. Therefore, a need has been recognized in connection with optimizing energy usage among the mobile devices in a group according to predetermined group policies.

SUMMARY OF THE INVENTION

There is broadly contemplated, in accordance with at least one presently preferred embodiment of the present invention, a method and apparatus which includes a remote network connected computer which obtains information about a wireless client's configuration and about the wireless access point. Examples of such configuration include the client's power-related parameters, such as the precise moments in time when the client's wireless interface wakes up to receive beacons from a wireless access point, and the client's current energy-related state, such as battery and display brightness levels.

In summary, one aspect of the invention provides an apparatus for facilitating wireless communication traffic for at least one client which communicates with an access point and which transitions between a power save mode and an active mode, the apparatus comprising: an arrangement for probing a client to determine its status with respect to communication with the access point; the probing arrangement being adapted to perform at least one of the following (a), (b) and (c): (a) ascertain the time of receipt of an initial beacon at a client; (b) ascertain at least one interval between which successive beacons are received by the client; and (c) ascertain a client time out interval for staying in active mode. Furthermore, the apparatus is extended to include an arrangement for scheduling wireless traffic for at least one client using at least one of the configuration parameters previously ascertained.

Another aspect of the invention provides a method of facilitating wireless communication traffic for at least one client which communicates with an access point and which transitions between a power save mode and an active mode, the method comprising the steps of: probing a client to determine its status with respect to communication with the access point; the probing step comprising performing at least one of the following (a), (b) and (c): (a) ascertaining the time of receipt of an initial beacon at a client; (b) ascertaining at least one interval between which successive beacons are received by the client; and (c) ascertaining a client time out interval for staying in active mode.

Furthermore, an additional aspect of the invention provides a program storage device readable by machine, tangibly embodying a program of instructions executable by the machine to perform method steps for facilitating wireless communication traffic for at least one client which communicates with an access point and which transitions between a power save mode and an active mode, the method comprising the steps of: probing a client to determine its status with respect to communication with the access point; the probing step comprising performing at least one of the following (a), (b) and (c): (a) ascertaining the time of receipt of an initial beacon at a client; (b) ascertaining at least one interval between which successive beacons are received by the client; and (c) ascertaining a client time out interval for staying in active mode.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
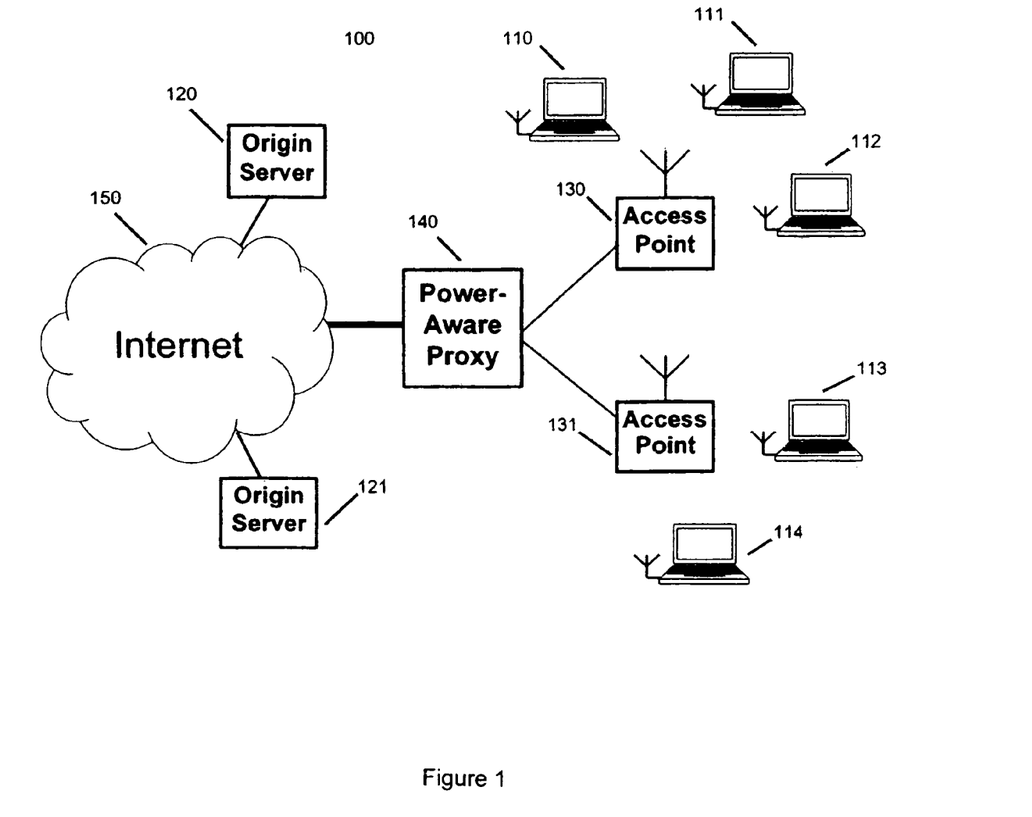
FIG. 1 illustrates a networking environment using a power-aware proxy to support client applications and schedule incoming Internet traffic to wireless clients.

FIG. 1 illustrates a networking environment (100) in which wireless clients (110)-(114) communicate with origin servers (120)-(121) through a variety of network components such as wireless access points (130) and (131), a power-aware proxy server (140) and the Internet (150). The proxy (140) is a remote network connected computer which supports client applications and schedules incoming Internet traffic for the wireless clients (110)-(114).

As may be seen from FIG. 1, the power-aware proxy (140), which in this case accepts or provides content from or to the internet (150), is in communication with one or more wireless access points (130) and (131) and which themselves are in communication with various wireless clients (110)-(114).

In the following, the term proxy is used to represent any remote network connected computer, except the client itself.

By way of an illustrative and non-restrictive example, an application addressed herein uses the popular 802.11 WLAN technology. The 802.11 specifications (see Part 11, "Wireless LAN Medium Access Control [MAC] and Physical layer [PHY] Specifications", ANSI/EEE Std 802.11, 1999) define two power management modes: active mode and power save mode. In power save mode, which is the 802.11 term for sleep mode, the WLAN interface consumes 5 to 50 times less power than in active mode. A typical WLAN driver switches the interface to power save mode after an idle interval of approximately 100 msecs. In such configurations, the relative power consumed by the WLAN interface varies from 5-10% in high-end laptops to more than 50% in PDAs.

The "bursty" character of the shaped traffic allows the WLAN interface to safely switch to power save mode after a shorter idle time interval, i.e., use a smaller timeout value, which reduces its energy consumption. Without using proxies, due to the hard-to-predict nature of incoming traffic, it is not possible to save energy by reducing the interface timeout without shaping the incoming traffic. This simplistic approach increases the roundtrip times of TCP connections, which degrades the performance of client applications.

By way of additional background, the disclosure now turns to a brief overview of the power management features of an 802.11 client interface, or station, in an infrastructure network.

The power management mode of a station can be either active or power save. The power state of a station can be either Awake, when the station is fully powered, or Doze, when the station consumes very little power but it is not able to receive or transmit frames. In active mode, the station is in the Awake state. In power save mode, the station is typically in Doze state but it transitions to Awake state to listen for select beacons, which are broadcasted every 102.4 ms by the wireless access point. The station selects how often it wakes up to listen to beacons when it associates with the access point. The transition between modes is always initiated by the station and requires a successful frame exchange with the access point.

The access point buffers all pending traffic for the stations known to be in power save mode and alerts these stations in the appropriate beacons. When a station detects that frames are pending in the access point, it sends a poll message to the access point. The station remains in the Awake state until it receives the response to its poll.

The access point's response to the poll is either the next pending frame or an acknowledgement (ACK) frame which signals that the access point delays the transmission of the pending frame and assumes the responsibility for initiating its delivery. The station must acknowledge (send an ACK frame for) every received frame. If the More Data field of the frame indicates additional pending frames, the station may send another poll frame. Otherwise, the station returns to Doze power state.

The power mode of the client station is controlled by the WLAN device driver. The station may switch from power save mode to active mode at any point in time, e.g., after receiving the first data frame from the access point, or after sending a data frame to the access point. The station will switch back to power save mode after no data frames are received or transmitted for a predetermined interval. Switching from active mode to power save mode delays receiving any frames until after the next beacon is received.

Switching a client from power save mode to active mode to receive frames is very advantageous from a performance standpoint, because in the active mode the access point will forward data frames to the client as soon as they come in, while in the power save mode it must queue them up and wait for the client to wake up. Unfortunately, in order to absorb variations in packet delivery, the client must remain in active mode while waiting for more data, which wastes power. Thus, from an energy standpoint, it is never advantageous to transition into the active mode except if it is known, or highly expected, that data will be coming in at a very high rate.

Figure 2:
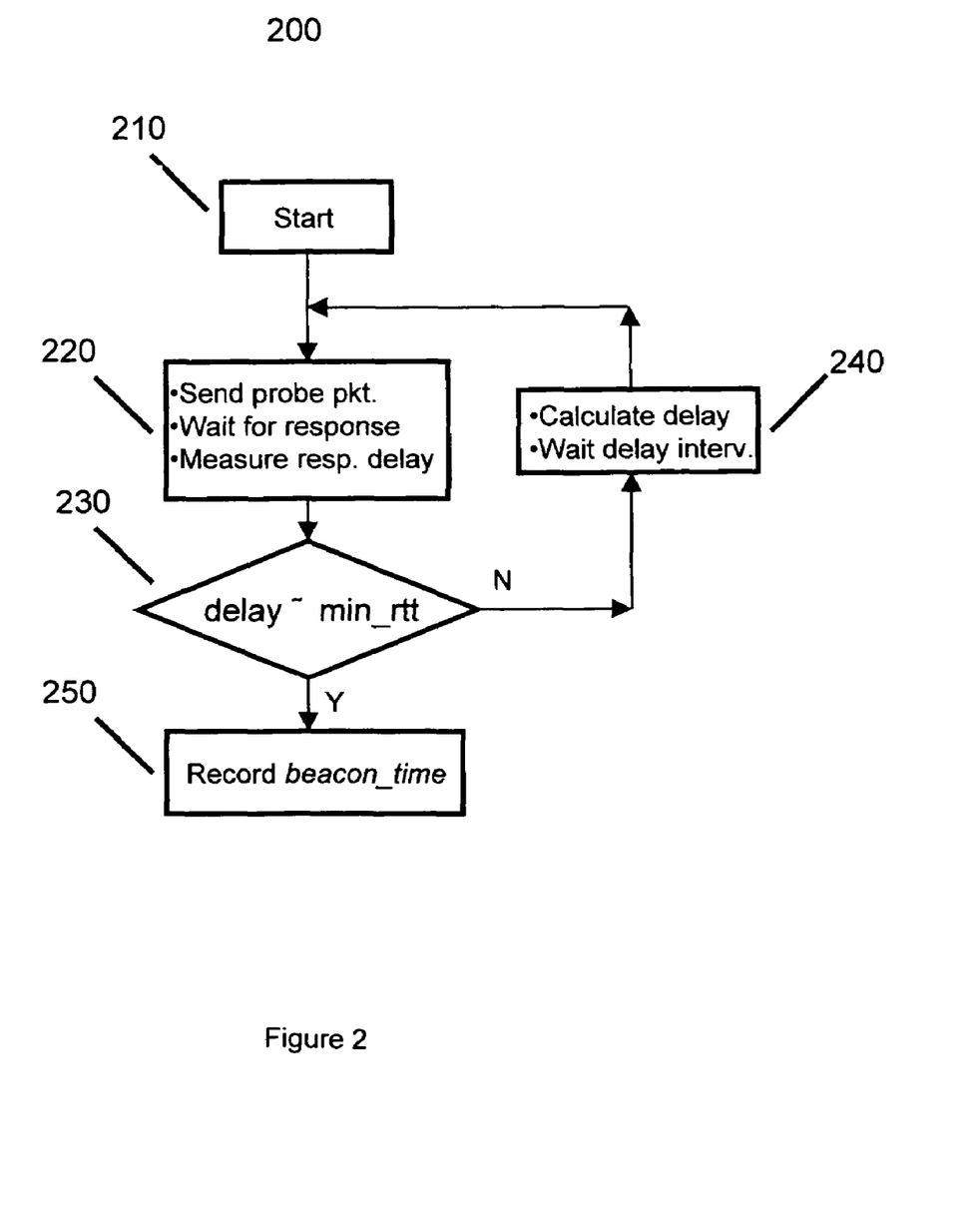
FIG. 2 illustrates the procedure for probing an 802.11-enabled wireless client to determine the time reference point at which the client receives a beacon.
Figure 3:
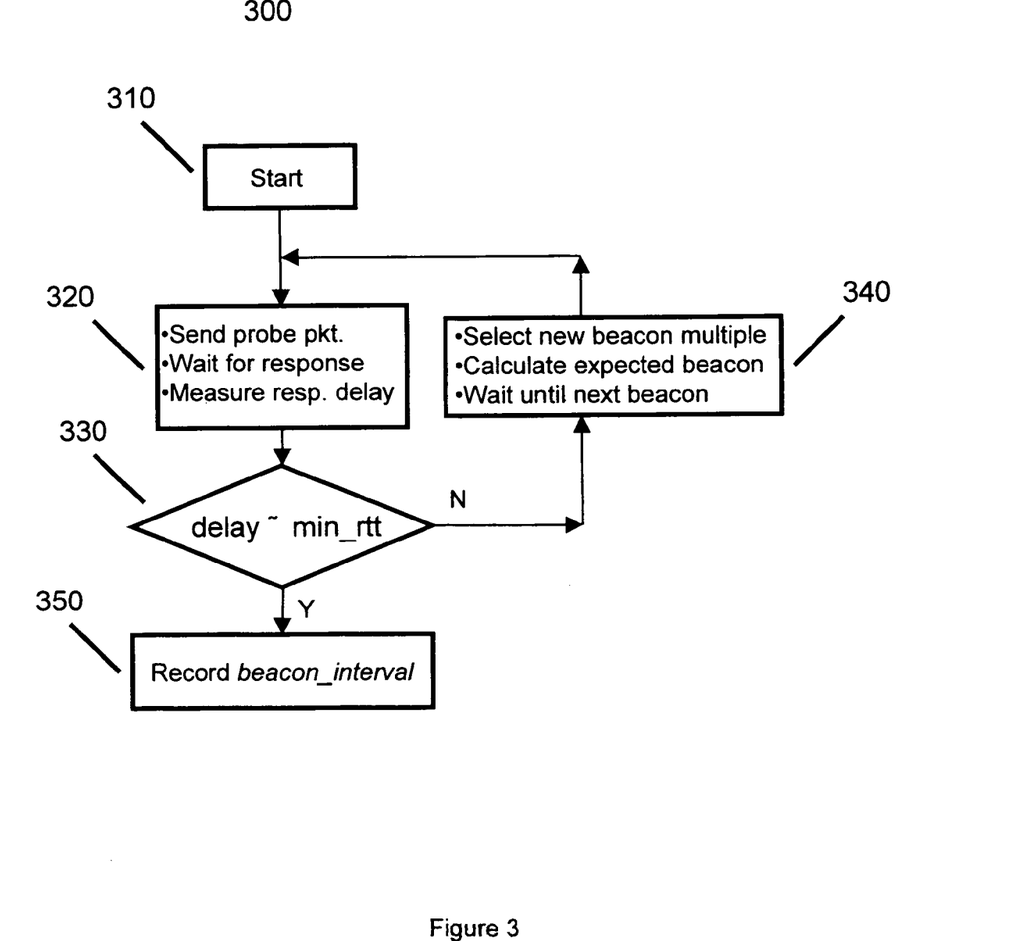
FIG. 3 illustrates the procedure for probing an 802.11-enabled wireless client to determine the time interval at which the client receives beacons.
Figure 4:
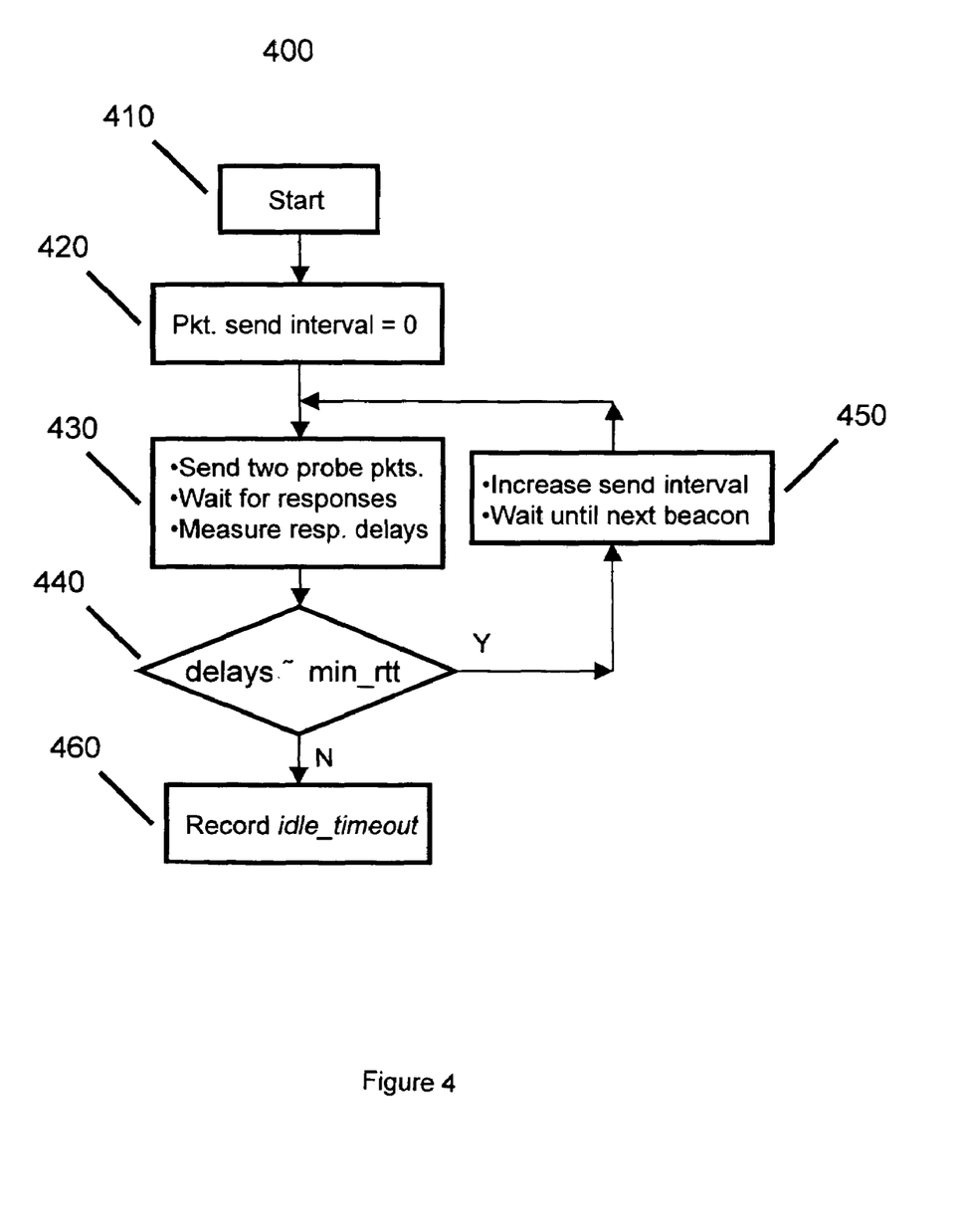
FIG. 4 illustrates the procedure for probing an 802.11-enabled wireless client to determine the idle timeout value after which the client returns from a high power state to a low power state.

With all the foregoing in mind, there are broadly contemplated, in accordance with at least one presently preferred embodiment of the present invention, protocols such as those illustrated in FIGS. 2, 3 and 4. Particularly, FIGS. 2, 3 and 4 illustrate procedures for probing an 802.11-enabled mobile device to synchronize with its interface operation and, to determine the configuration parameters of its WLAN interface, and particularly to determine time intervals for interacting with beacons or staying in a power-save mode as discussed above. The procedures illustrated in FIGS. 2, 3 and 4 are executed on the proxy (140).

FIGS. 2, 3 and 4 illustrate the process of determining the beacon times for a base station, the beacon interval or multiplicity of a given WLAN client and the client's timeout interval. In the following, it is assumed that the WLAN client is configured to take advantage of the Power Save mode. Therefore, packets sent to the client sometimes get buffered in the base station until the next beacon that the client is configured to listen to. Furthermore, it is assumed that the client always responds to these probe packets immediately. Response packets are never delayed by the base station. Packets sent to the client when the client is in active mode or immediately before the beacon, when the client is in power save mode, trigger an immediate response. In the following, the time taken by such a fast response is called min_rtt (which may be termed, "minimum round trip time"). Its value can be determined by the proxy using a train of packets to the client, some of which are guaranteed to be forwarded immediately by the base station, either because the client is in active mode or because they happen to be sent immediately before a beacon is sent. Due to very small MAC-level delays, the measured min_rtt values are actually a randomly distributed collection of values, with a lower bound determined by the size of the probe packets, the WLAN technology and base station used. In summary, any measured rtt (round trip time) that is very close, within one or two msecs from this bound is considered to be a min_rtt.

FIG. 2 illustrates a process (200) for probing to determine a "beacon time" parameter. Note that this parameter characterizes the WLAN base station and therefore, needs to be determined only for the first client using the base station. As shown, the proxy starts the process at step (210). Next a probe packet is sent to a device, a response is awaited and the response delay is measured in step (220). If the measured response delay is not approximately equal to the predetermined parameter min_rtt in step (230), then the delay is calculated and a delay interval is traversed in step (240) before sending out another probe packet in step (220). If the response delay is indeed approximately equal to min_rtt in step (230), then the resultant parameter beacon_time is recorded in step (250).

FIG. 3 illustrates a process (300) for probing to determine a "beacon interval" parameter. As shown, the proxy starts the process at step (310). Next, a probe packet is sent to a device, a response is awaited and the response delay is measured in step (320). If the measured response delay is not approximately equal to min_rtt in step (330), then a new beacon multiple is selected, the expected beacon is calculated, and the next beacon is awaited in step (340) before sending out another probe packet in step (320). If the response delay is indeed approximately equal to min_rtt in step (330), then the resultant parameter beacon_interval is recorded in step (350).

In reality, the individual beacons may be delayed, or the client may temporarily be in the Awake state, or the client is not the first client to receive buffered packets from the access point. All these effects will incorrectly influence the measurement of the beacon_time and the beacon_interval at the proxy. To cancel out these effects, the beacon_time and the beacon_interval should be measured several times over an extended period to determine if the measured values of the beacon_time are spaced at whole multiples, and the beacon_interval is a whole multiple, of 102.4 milliseconds which is the interval, or multiples thereof, with which access points send out beacons.

FIG. 4 illustrates a process (400) for probing to determine an "idle timeout" parameter. As shown, the proxy starts the process at step (410). Next, a packet send interval is first set to zero in step (420) and then two probe packets are sent out in step (430). The two packets must be sent out at a time when it is known that the client will be receiving a beacon, which is determined based on the previous two measurements of the beacon_time and the beacon_interval. Next, responses to the two probe packets are awaited and the response delays are measured, also performed in step (430). If the measured response delays are approximately equal to min_rtt in step (440), then the packet send interval is increased and the next beacon is awaited in step (450) before sending two more probe packets in step (430). The send interval is increased until the response delay is no longer approximately equal to min_rtt, at which point it may be determined that the resultant parameter idle_timeout is equal to the send interval in step (460).

In reality, the individual beacons may be delayed, or the client may temporarily be in the Awake state, or the client is not the first client to receive buffered packets from the access point. All these effects will incorrectly influence the measurement of the idle_timeout at the proxy. To cancel out these effects, the idle_timeout should be measured several times over an extended period to determine if the measured values of the idle_timeout are repeatable.

In addition to power modes and states of the WLAN interface, the present invention preferably also takes into account other power-related characteristics of the WLAN client such as remaining battery power, the idle battery power drain, the power consumption of the wireless interface, and the client's overall power consumption and its relationship with the incoming traffic characteristics, such as rate and burstiness.

It is to be understood that the present invention, in accordance with at least one presently preferred embodiment, includes an arrangement for probing a client to determine its status with respect to communication with the access point, which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
an arrangement that facilitates network communication for at least one client which communicates with a wireless access point, wherein a wireless interface of said at least one client transitions between at least two power states, said arrangement that facilitates network communication traffic further comprising:
an arrangement that determines a configuration of said at least one client for transitioning between said power states, wherein said arrangement is adapted to perform one or more of the following (a), (b) and (c):
(a) ascertain a time of receipt of an initial beacon via:
transmitting a probe packet;
measuring a response delay of said at least one client subsequent to transmission of a probe packet; and
continuing to measure response delays of said at least one client subsequent to transmission of additional probe packets until the response delay is substantially equivalent to a predetermined minimum round trip time;
(b) ascertain at least one interval between which successive beacons are received by the at least one client via:
transmitting a probe packet;
measuring a response delay of said at least one client subsequent to transmission of a probe packet;
calculating a new beacon multiple and awaiting a new beacon if the response delay is not substantially equivalent to a predetermined minimum roundtrip time; and
continuing to measure response delays of said at least one client subsequent to transmission of additional probe packets until the response delay is substantially equivalent to a predetermined minimum roundtrip time; and
(c) ascertain a client time interval for staying in active mode via:
transmitting a pair of probe packets;
measuring a response delay of said at least one client subsequent to transmission of a probe packet;
adjusting a packet sent interval and awaiting a new beacon if response delays are not substantially equivalent to a predetermined minimum roundtrip time; and
continuing to measure response delays of said at least one client subsequent to transmission of additional probe packets until the response delay is substantially equivalent to a predetermined minimum round trip time.

2. The apparatus according to claim 1, wherein the wireless communication traffic comprises internet traffic.

3. The apparatus according to claim 1, wherein the wireless access point and the wireless interface use 802.11 technology.

4. The apparatus according to claim 1, wherein said arrangement that determines a configuration of said at least one client is adapted to ascertain a time of receipt of an initial beacon solely at one client prior to receipt of one or more further beacons at one or more further clients.

5. The apparatus according to claim 1, wherein said wireless access point sends periodic beacon messages to said at least one client.

6. The apparatus according to claim 1, wherein:
said at least two power states comprise a low power state and a high power state; and
said arrangement that determines a configuration of said at least one client is adapted to ascertain a client time out interval for at least one of the following:
staying in said high power state;
staying in awake state;
staying in the active mode.

7. The apparatus according to claim 1, further comprising:
an arrangement that schedules wireless communication traffic to said at least one client based on the configuration of said at least one client.

8. The apparatus according to claim 7, wherein the arrangement that schedules wireless communication traffic is implemented on a remote networked computer.

9. The apparatus according to claim 8, wherein the remote networked computer comprises a power-aware proxy server.

10. A method comprising:
facilitating network communication for at least one client which communicates with a wireless access point and where a wireless interface of said at least one client transitions between at least two power states, said facilitating further comprising:
  determining a configuration of said at least one client for transitioning between said power states;
  wherein said determining a configuration of said at least one client for transitioning between said power states comprises one or more of the following (a), (b) and (c):
  (a) ascertaining a time of receipt of an initial beacon via:
    transmitting a probe packet;
    measuring a response delay of said at least one client subsequent to transmission of a probe packet; and
    continuing to measure response delays of said at least one client subsequent to transmission of additional probe packets until the response delay is substantially equivalent to a predetermined minimum round trip time;
  (b) ascertaining at least one interval between which successive beacons are received by the at least one client via:
    transmitting a probe packet;
    measuring a response delay of the at least one client subsequent to transmission of a probe packet;
    calculating a new beacon multiple and awaiting a new beacon if the response delay is not substantially equivalent to a predetermined minimum round trip time; and
    continuing to measure response delays of the at least one client subsequent to transmission of additional probe packets until the response delay is substantially equivalent to a predetermined minimum round trip time; and
  (c) ascertaining a client time interval for staying in active mode via:
    transmitting a pair of probe packets;
    measuring a response delay of the at least one client subsequent to transmission of a probe packet;
    adjusting a packet send interval and awaiting a new beacon if response delays are not substantially equivalent to a predetermined minimum round trip time; and
    continuing to measure response delays of the at least one client subsequent to transmission of additional probe packets until the response delay is substantially equivalent to a predetermined minimum round trip time.

11. The method according to claim 10, wherein the wireless communication traffic comprises internet traffic.

12. The method according to claim 10, wherein the wireless access point comprises an 802.11 client interface.

13. The method according to claim 10, wherein said determining a configuration of said at least one client comprises ascertaining the time of receipt of an initial beacon solely at one client prior to receipt of one or more further beacons at one or more further clients.

14. The method according to claim 10, wherein said wireless access point sends periodic beacon messages to said at least one client.

15. The method according to claim 10, wherein said at least two power states of said wireless interface include a low power state and a high power state and said determining a configuration of said at least one client comprises ascertaining a client time out interval for at least one of the following (a), (b) and (c):
  (a) staying in said high power state;
  (b) staying in awake state; and
  (c) staying in the active mode.

16. The method according to claim 10, further comprising:
scheduling wireless communication traffic to said at least one client based on the configuration of said at least one client.

17. A program storage device readable by machine, tangibly embodying a program of instruction executable by the machine to perform steps, said steps comprising:
facilitating network communication for at least one client which communicates with a wireless access point, wherein a wireless interface of said at least one client transitions between at least two power states, said facilitating further comprising:
  determining a configuration of said at least one client for transitioning between said power states;
  wherein said determining a configuration of said at least one client for transitioning between said power states comprises one or more of the following (a), (b) and (c):
  (a) ascertaining a time of receipt of an initial beacon via:
    transmitting a probe packet;
    measuring a response delay of said at least one client subsequent to transmission of a probe packet; and
    continuing to measure response delays of said at least one client subsequent to transmission of additional probe packets until the response delay is substantially equivalent to a predetermined minimum round trip time;
  (b) ascertaining at least one interval between which successive beacons are received by the at least one client via:
    transmitting a probe packet;
    measuring a response delay of the at least one client subsequent to transmission of a probe packet;
    calculating a new beacon multiple and awaiting a new beacon if the response delay is not substantially equivalent to a predetermined minimum round trip time; and
    continuing to measure response delays of the at least one client subsequent to transmission of additional probe packets until the response delay is substantially equivalent to a predetermined minimum round trip time; and
  (c) ascertaining a client time interval for staying in active mode via:
    transmitting a pair of probe packets;
    measuring a response delay of the at least one client subsequent to transmission of a probe packet;
    adjusting a packet send interval and awaiting a new beacon if response delays are not substantially equivalent to a predetermined minimum round trip time; and
    continuing to measure response delays of the at least one client subsequent to transmission of additional probe packets until the response delay is substantially equivalent to a predetermined minimum round trip time.

18. The program storage device according to claim 17, wherein the wireless communication traffic comprises internet traffic.

19. The program storage device according to claim 17, wherein the wireless access point comprises an 802.11 client interface.

20. The program storage device according to claim 17, wherein said determining a configuration of said at least one client comprises ascertaining the time of receipt of an initial beacon solely at one client prior to receipt of one or more further beacons at one or more further clients.

21. The program storage device according to claim 17, wherein said wireless access point sends periodic beacon messages to said at least one client.

22. The program storage device according to claim 17, wherein said at least two power states of said wireless interface include a low power state and a high power state and said determining a configuration of said at least one client comprises ascertaining a client time out interval for at least one of the following (a), (b) and (c):
   (a) staying in said high power state;
   (b) staying in awake state; and
   (c) staying in the active mode.

23. The program storage device according to claim 17, wherein the steps further comprise:
   scheduling wireless communication traffic to said at least one client based on the configuration of said at least one client.

* * * * *